(12) United States Patent
Raffaelle et al.

(10) Patent No.: US 9,076,570 B2
(45) Date of Patent: Jul. 7, 2015

(54) NANO-COMPOSITE STRUCTURES, METHODS OF MAKING, AND USE THEREOF

(75) Inventors: Ryne P. Raffaelle, Honeoye Falls, NY (US); Brian J. Landi, Rochester, NY (US); Cory D. Cress, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 1520 days.

(21) Appl. No.: 12/102,201

(22) Filed: Apr. 14, 2008

(65) Prior Publication Data

US 2008/0254362 A1 Oct. 16, 2008

Related U.S. Application Data

(60) Provisional application No. 60/911,581, filed on Apr. 13, 2007.

(51) Int. Cl.
*H01M 6/02* (2006.01)
*H01B 1/06* (2006.01)
(Continued)

(52) U.S. Cl.
CPC ............... *H01B 1/122* (2013.01); *B82Y 30/00* (2013.01); *H01B 1/04* (2013.01); *H01G 9/058* (2013.01); *H01G 11/36* (2013.01); *H01G 11/42* (2013.01); *H01M 4/38* (2013.01); *H01M 4/587* (2013.01); *H01M 4/621* (2013.01); *H01M 4/625* (2013.01); *H01M 4/9075* (2013.01);
(Continued)

(58) Field of Classification Search
CPC ....... B82Y 30/00; H01G 11/36; H01G 11/42; H01G 9/058; H01M 10/0525; H01M 4/38; H01M 4/587; H01M 4/621; H01M 4/625; H01M 4/9075; H01M 4/9083; H01M 4/92; H01M 4/921; H01M 4/923; H01M 4/925; H01M 4/926; Y02E 60/122; Y02E 60/13; Y02E 60/50

See application file for complete search history.

(56) References Cited

U.S. PATENT DOCUMENTS 6,334,939 B1  1/2002  Zhou et al.
6,514,395 B2  2/2003  Zhou et al.
(Continued)

FOREIGN PATENT DOCUMENTS

JP    07299359 A  * 11/1995  ............... B01J 23/62
JP    2004356078 A * 12/2004  ............... H01M 4/58
(Continued)

OTHER PUBLICATIONS

A.A. Setlur, J.Y. Dai, J.M. Lauerhaas, R.P.H. Chang. Formation of filled Carbon Nanotubes and Nanoparticles using polycyclic aromatic hydrocarbon molecules, Carbon 1998, vol. 36, No. 5-6, 721-723.*

(Continued)

*Primary Examiner* — Carlos Barcena
(74) *Attorney, Agent, or Firm* — Joseph M. Noto; Bond Schoeneck & King PLLC

(57) ABSTRACT

The present invention relates to a polymer-free nano-composite structure containing nanostructured carbon and nanoparticles. Also disclosed are methods of making the polymer-free nano-composite structures. The present invention also relates to a lithium ion battery, a capacitor, a supercapacitor, a battery/capacitor, or a fuel cell containing the polymer-free nano-composite structures of the present invention.

9 Claims, 8 Drawing Sheets

(51) Int. Cl.
*H01G 9/022* (2006.01)
*H01M 8/02* (2006.01)
*H01B 1/24* (2006.01)
*H01B 1/12* (2006.01)
*B82Y 30/00* (2011.01)
*H01B 1/04* (2006.01)
*H01G 9/04* (2006.01)
*H01G 11/36* (2013.01)
*H01G 11/42* (2013.01)
*H01M 4/38* (2006.01)
*H01M 4/62* (2006.01)
*H01M 4/90* (2006.01)
*H01M 4/92* (2006.01)
*H01M 10/0525* (2010.01)
*H01M 4/587* (2010.01)

(52) U.S. Cl.
CPC ............ *H01M 4/9083* (2013.01); *H01M 4/92* (2013.01); *H01M 4/921* (2013.01); *H01M 4/923* (2013.01); *H01M 4/925* (2013.01); *H01M 4/926* (2013.01); *H01M 10/0525* (2013.01); *Y02E 60/122* (2013.01); *Y02E 60/13* (2013.01); *Y02E 60/50* (2013.01)

(56) References Cited

U.S. PATENT DOCUMENTS

| | | | |
|---|---|---|---|
| 6,752,977 B2 | 6/2004 | Smalley et al. | |
| 6,783,702 B2 | 8/2004 | Niu et al. | |
| 6,863,942 B2 | 3/2005 | Ren et al. | |
| 6,890,685 B2 | 5/2005 | Yamamoto et al. | |
| 6,936,233 B2 | 8/2005 | Smalley et al. | |
| 7,008,604 B2 | 3/2006 | Smalley et al. | |
| 7,029,794 B2 | 4/2006 | Ogura et al. | |
| 7,060,390 B2 | 6/2006 | Chen et al. | |
| 2003/0151030 A1* | 8/2003 | Gurin | 252/502 |
| 2005/0022726 A1* | 2/2005 | Wong et al. | 117/105 |
| 2007/0209584 A1* | 9/2007 | Kalynushkin et al. | 118/311 |

FOREIGN PATENT DOCUMENTS

| | | | | |
|---|---|---|---|---|
| KR | 1020060019851 | * | 3/2006 | ............. H01M 4/90 |
| WO | WO 2007003513 A1 | * | 1/2007 | |

OTHER PUBLICATIONS

S.H. Ng, J. Wang, Z.P. Guo, J. Chen, G.X. Wang, H.K. Liu. Single wall carbon nanotube paper as anode for lithium-ion battery, Electrochimica Acta 51 (2005) 23-28.*

Eom et al., "Electrochemical Insertion of Lithium into Multiwalled Carbon Nanotube/Silicon Composites Produced by Ballmilling," J. Electrochem. Soc. 153(9):A1678-A1684 (2006).

Holzapfel et al., "Nano Silicon for Lithium-Ion Batteries," Electrochimica Acta 52:973-978 (2006).

Kim et al., "Carbon Nanotubes (CNTs) as a Buffer Layer in Silicon/CNTs Composite Electrodes for Lithium Secondary Batteries," J. Power Sources 162:1275-1281 (2006).

Raffaelle et al., "Carbon Nanotubes for Power Applications," Mat. Sci. Engineer. B 116:233-243 (2005).

Zhang et al., "Composite Anode Material of Silicon/Graphite/Carbon Nanotubes for Li-Ion Batteries," Electrochimica Acta 51:4994-5000 (2006).

* cited by examiner

NANO-COMPOSITE STRUCTURES, METHODS OF MAKING, AND USE THEREOF

This application claims the priority benefit of U.S. Provisional Patent Application Ser. No. 60/911,581, filed Apr. 13, 2007, which is hereby incorporated by reference in its entirety.

The subject matter of this application was made with support from the United States Government under grant number NRO000-06-C-0241. The United States Government has certain rights.

FIELD OF THE INVENTION

The present invention relates to nano-composite structures; methods of their manufacture; and batteries, capacitors, and fuel cells containing the nano-composite structures.

BACKGROUND OF THE INVENTION

Lithium-based battery cells are an attractive energy source for portable applications due in part to their ability to provide relatively high energies and long cycle life. Lithium is the lightest of all the metals, with a high electrochemical potential, thus providing high energy densities. Rechargeable batteries using lithium as the electrochemical material are capable of providing higher energy to weight ratios than those using other chemistries.

The voltage of lithium ion batteries corresponds to the total energy capacity and depends on the choice of the anode and cathode couples used in the battery cell. High voltage cathode materials include, among others, $Li_xMnO_y$, $Li_xCoO_y$, and $Li_xNiO_y$. Of these, the nickel based material, particularly $LiNiO_2$, has the highest capacity, and as a result has become a focus area for the enhancement of lithium cell energy. While cells incorporating this material yield higher energy, assessing all the energy leads to material instability that in turn results in poor cycle life characteristics of the cells.

The most widely used active material for positive electrodes for lithium ion secondary batteries is lithium-cobalt composite oxide. However, lithium-cobalt composite oxide electrodes require an expensive cobalt compound for raw material, increasing the cost of the positive electrode material, and resulting in the higher cost of the secondary battery. Thus, there is a need for an inexpensive substitute for the active material for positive electrodes.

Research is currently underway on lithium-metal composite oxides, where the metal is selected from manganese and nickel, as a replacement for the lithium-cobalt composite oxide. In particular, the lithium-nickel composite oxide manifests the same high voltage as the lithium-cobalt composite oxide, and has a theoretical capacity greater than that of the lithium-cobalt composite oxide, and the Ni raw material is less expensive than Co, and available in stable supply. In addition, lithium-nickel composite oxide electrodes have a higher charge capacity and discharge capacity, and improved cycle characteristics in comparison to lithium-cobalt composite oxide electrodes. However, lithium-nickel composite oxide electrodes have the following disadvantages: (i) discharge capacity is less in comparison to charge capacity; (ii) the irreversible capacity, or so called "retention" defined by the difference between the charge capacity and discharge capacity is considerable; and (iii) battery performance is comparatively easily degraded when used in high or low temperature environments.

To improve cycle characteristics, a different element (e.g., B, Al, In and Sn, or $Li(Ni, Co)O_2$ composite oxide) may be added for substitution in the lithium-nickel composite oxide. While this improves cycle characteristics, it also narrows the range within which intercalation-deintercalation of the lithium ions is obtained, and tends to reduce discharge capacity. This reduction in discharge capacity is known to be particularly apparent under conditions of high load at high discharge currents, and conditions of high efficiency discharge at low temperatures where lithium ion mobility in electrolyte is reduced at low temperatures.

Output characteristics of secondary batteries at low and/or high temperatures are important when the secondary batteries are installed in equipment used in environments in which temperature variation is large. In particular, if use in cold regions is considered, the secondary batteries must have sufficient output characteristics required at low temperature. Improvement in the output characteristics at low temperature is therefore an important consideration when the lithium ion secondary batteries with lithium-nickel composite oxide are installed in e.g., motor vehicles.

Carbon-based materials such as crystalline graphite with high crystallinity are used for negative electrodes in lithium-ion batteries. This type of graphite has a layered structure, and lithium ions are intercalated from the edge of the layered graphite to the intervals of graphite layers during charging of a secondary battery, thereby producing a Li-graphite intercalation compound.

When graphite is used as a negative active material to prepare a negative electrode, the planes of the graphite layers are parallel to the plane of the collector, since most graphite is flake-shaped. Therefore, the edges of the graphite layers are aligned in a direction perpendicular to the positive electrode and, therefore, lithium ions which are deintercalated from the positive electrode cannot easily intercalate to the graphite layers during charging. In particular, when a battery is charged at a high rate, lithium ions are insufficiently intercalated to the graphite layers and discharge characteristics consequently deteriorate.

In addition, since a lithium secondary battery is generally charged under constant current and constant voltage (CC-CV) and it is discharged under constant current, lithium ions that are deeply intercalated to the crystalline graphite layers are not fully deintercalated when the battery is discharged at high rates, thereby deteriorating cycle life characteristics. Cycle life characteristics of a conventional lithium secondary battery further deteriorate because the lithium ions that deintercalate are insufficient to intercalate to the graphite layers, and too many lithium ions remain in the graphite.

Electrical resistivity of a graphite-containing composition in the inner plane direction of a graphite layer (an (ab) plane or a (002) plane) is about 1000 times that of the plane direction of the graphite layer. Therefore, if the alignment of graphite can be controlled, anisotropy of graphite may decrease or it may be eliminated, and the graphite can be used in electronic appliances as well as in batteries. However, for a lithium ion battery with a carbonous (graphite) anode, the theoretical amount of lithium which can be intercalated by the anode is only an amount of $\frac{1}{6}$ per carbon atom at the most. Thus, when the amount of lithium intercalated by the anode is made to be greater than the theoretical amount upon charging or when charging is performed under condition of high electric current density, there will be an unavoidable problem of lithium deposition in a dendritic state (that is, in the form of a dendrite) on the surface of the anode. This will result in causing internal-shorts between the anode and the cathode upon repeating the charge-and-discharge cycle. Therefore, it is difficult for the lithium ion battery with the carbonous (i.e., graphite) anode to achieve a high capacity.

Rechargeable lithium batteries in which a metallic lithium is used as the anode have been proposed. Metallic lithium electrodes exhibit a high energy density. However, the charge-and-discharge cycle life is extremely short, because the metallic lithium reacts with impurities such as moisture and organic solvents present in the electrolyte solution and form an insulating film. In addition, the metallic lithium anode has an irregular surface with portions to which electric field is converged. These factors lead to generating a dendrite of lithium upon repeating the charge-and-discharge cycle, resulting in internal-shorts between the anode and cathode. As a result, the charge-and-discharge cycle life of the rechargeable battery is extremely shortened. A lithium-aluminum alloy has been used in an attempt to eliminate the problems of the metallic lithium. However, because the lithium alloy is hard it is difficult to produce a spiral-wound cylindrical rechargeable battery.

Thus, there is a need for new materials for electrodes that can improve electrode performance and, in particular, the charge-and-discharge cycle of lithium ion batteries. The present invention is directed to overcoming these and other limitations in the art.

SUMMARY OF THE INVENTION

A first aspect of the present invention relates to a nano-composite structure made of nanostructured carbon and nanoparticles.

A second aspect of the present invention relates to a lithium ion battery containing the nano-composite structure of the present invention, where the nano-composite structure is present as at least one electrode in the lithium ion battery.

A third aspect of the present invention relates to a capacitor, supercapacitor, or battery/capacitor containing the nano-composite structure according to the present invention.

A fourth aspect of the present invention relates to a fuel cell containing the nano-composite structure according to the present invention.

A fifth aspect of the present invention relates to a method of making a nano-composite structure. This method involves providing a dispersion of nanostructured carbon in an organic solvent. Nanoparticles are incorporated into the dispersion. The dispersion containing the nanostructured carbon and nanoparticles is formed into a nano-composite structure.

A sixth aspect of the present invention relates to a method of making a nano-composite structure. This method involves providing a dispersion of nanostructured carbon in an organic solvent. The dispersion is formed into a sheet. Nanoparticles are incorporated into the sheet under conditions effective to make a nano-composite structure.

The present invention concerns nano-composite materials that include nanostructured carbon and nanoparticles formed into thin, paper-like, freestanding sheets. The present inventors have developed an extensive understanding of single wall carbon nanotube ("SWNT") purity, solvent dispersions, and paper fabrication to develop high quality nano-composite structures. The materials are suitable for forming into electrode structures and can be incorporated into e.g., lithium ion batteries, lithium ion polymer electrolyte batteries, capacitors, supercapacitors, battery/capacitors, and fuel cells.

The nano-composite structures according to the present invention eliminate the necessity of metallic electrodes, such as copper, for the bulk support of active materials. The nano-composite structures improve the electronic and ionic transport within devices and allow the efficient use of carbonous and non-carbonous active materials. Furthermore, the nano-composite structures can be formed into electrodes that are lightweight and flexible, have a thermal stability exceeding 600° C., a high surface area, and high conductivity.

The nano-composite electrodes of the present invention reduce overall battery mass by replacing traditional metal foil supports (density~10 g/cm$^3$) with a carbon based electrode (density~1 g/cm$^3$) and provide a more efficient use of the materials present. The electrodes according to the present invention also allow higher mass and volume specific capacity and improved charge/discharge rates. Electrodes formed from the nano-composite materials of the present invention also have the potential to be cycled over a larger temperature range than conventional electrodes.

Accordingly, the nano-composite structures according to the present invention are an improvement over electrodes formed from other metallic, metallic oxide, and/or carbonous materials (e.g., graphite or carbon black).

DETAILED DESCRIPTION OF THE INVENTION

Figure 1:
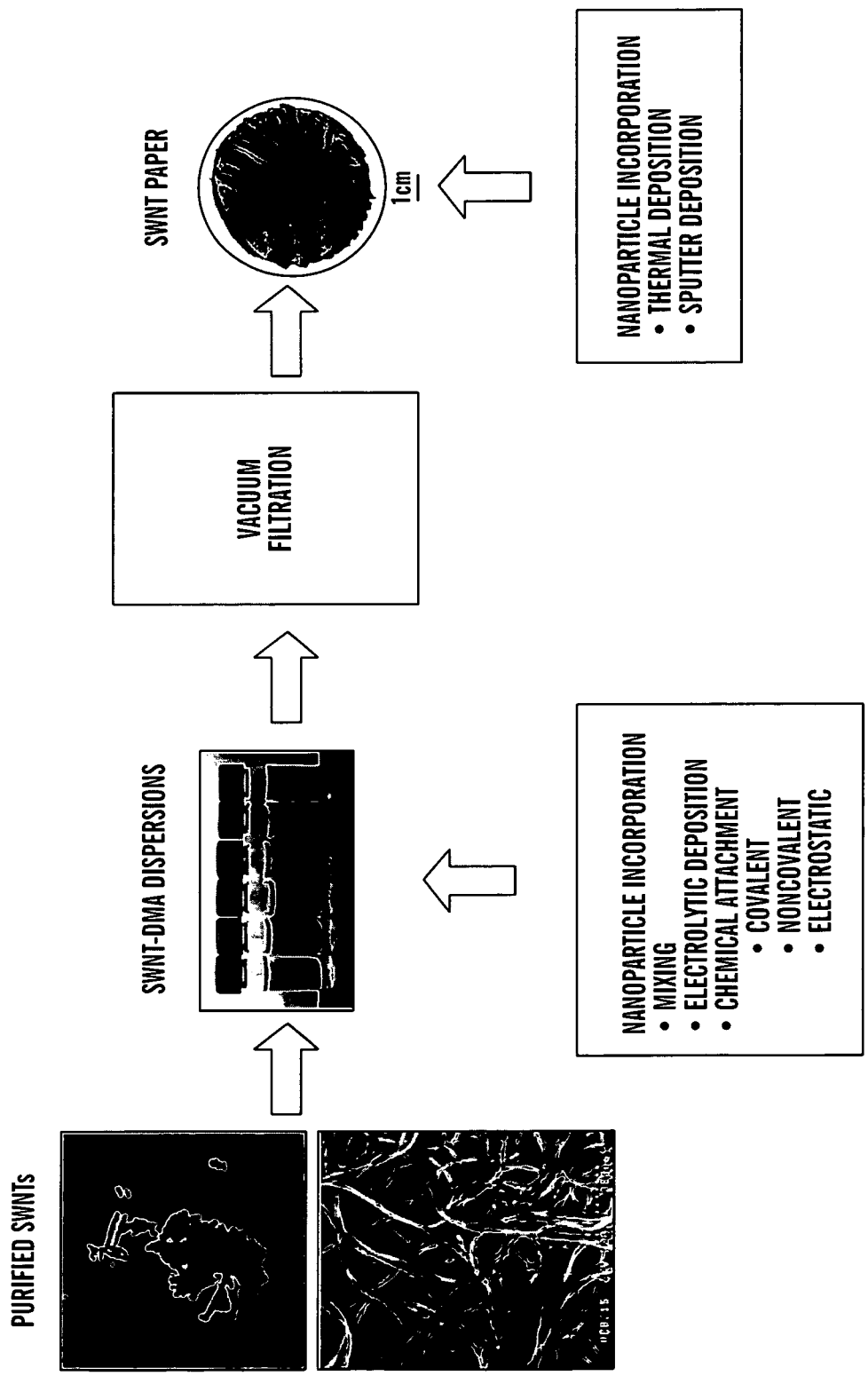
FIG. 1 is a diagram showing the process of making nano-composite structures of the present invention.

The present invention concerns nano-composite materials that can be formed into thin, paper-like, freestanding structures, methods of making the nano-composite structures, and use thereof as electrodes in electrochemical power generation and storage devices including, without limitation, lithium ion batteries, capacitors, supercapacitors, batteries/capacitors, solar cells, and fuel cells.

The nano-composite materials are characterized by a combination of nanostructured carbon and nanoparticles. As used herein, "nanostructured carbon" refers to raw nanostructured carbon soot, purified nanostructured carbon, or mixtures thereof. Specifically, nanostructured carbon refers to materials with at least one critical size dimension less than about 1 μm. Nanostructured carbon exists in a variety of forms including, but not limited to, carbon nanotubes, nano-onions, nano-horns, and fullerenes. In a preferred embodiment, the nano-structured carbon is in the form of carbon nanotubes, such as SWNTs, double wall carbon nanotubes, multi-wall carbon nanotubes, or mixtures thereof. Most preferable, the nanostructured carbon is in the form of SWNTs.

As used herein, "purified" nanostructured carbon refers to at least 75% w/w purity or, more preferably, at least 85% w/w purity or, most preferably, at least 95% w/w purity. Purifying nanostructured carbon and determining purity levels can be carried out according to methods and procedures described in U.S. Patent Application Publication No. 2008/0008643, which is hereby incorporated by reference in its entirety. Purification of nanostructured carbon is also discussed in Landi et al., "Thermal Oxidation Profiling of Single-Walled Carbon Nanotubes," *Chem. Mater.* 17:6819-6834 (2005), which is hereby incorporated by reference in its entirety.

Nanostructured carbon can be obtained commercially or prepared by a variety of synthetic routes known and practiced by those of ordinary skill in the art. The synthesis of nanostructured carbon can be accomplished in a wide variety of methods that involve the catalytic decomposition of a carbon containing gas or solid. Some of the most common techniques for the synthesis of carbon nanotubes, fullerenes, nanohorns, etc., are chemical vapor deposition, arc-discharge, and laser vaporization synthesis. The synthesis conditions (e.g., temperature, pressure, carrier gas, etc.), metal catalyst type (most commonly iron, nickel, cobalt, or yttrium), and carbon source (graphite or hydrocarbon) have all been shown to influence the properties of the resulting carbon materials.

For purposes of the present invention, nanostructured carbon may contain two or more forms of nanostructured carbon. For example, SWNTs may be combined with amorphous nanostructured carbon to form a dispersion. It may be desirable to combine SWNTs made in a synthesis reactor with a metal catalyst with amorphous nanostructured carbon made in the same reactor without the metal catalyst. It may be also be desirable to disperse nanostructured carbon in more than one form in predetermined mass ratios.

Nanoparticles of the nano-composite structures of the present invention may be semiconductor nanoparticles, metallic nanoparticles, or a mixture of both semiconductor and metallic nanoparticles. Exemplary semiconductor nanoparticles are formed from Si, Ge, GaSb, InSb, SnSe, SnTe, GaP, GaAs, InAs, $TiO_2$, InP, AlP, AlAs, ZnTe, CdSe, CdTe, or mixtures or alloys thereof. Exemplary metallic nanoparticles are formed from Sn, Cu, Pd, Pt, Au, Al, In, Ag, Ni, Co, Fe, Zn, Mn, V, Ti, Pb, Rh, Li, Na or mixtures, alloys, or oxides thereof. The nanoparticles preferably have a critical dimension of less than about 1 µm or, more preferably, less than about 500 nm or, more preferably, less than about 250 nm or, most preferably, about 1-50 nm. The nanoparticles preferably have a three-dimensional geometric shape that is spherical, cubic, rod, oligo-pod, pyramidal, or highly branched.

The nano-composite structures of the present invention may have a weight ratio of nanostructured carbon to nanoparticles that varies according to the particular application or use. The weight ratio of nanostructured carbon to nanoparticles may be at about 0.01:1-100:1, about 0.02:1-50:1, about 0.05:1-20:1, about 0.1:1-10:1, about 0.2:1-5:1, about 0.5:1-2:1, or about 1:1, preferably about 0.05:1-20:1 or about 0.1:1-10:1.

According to one embodiment, the nano-composite structure is a freestanding structure (e.g., in sheet form) and includes about 5-10% w/w nanostructured carbon and about 90-95% w/w nanoparticles.

The nano-composite structures according to the present invention may contain a polymeric binder. Suitable polymeric binders include, without limitation, polyvinylidene difluoride, poly(acrylonitrile)-(PAN), Nafion, polyaniline, poly(ethylene oxide), poly(ethylene glycol), poly(propylene glycol), polyacrylamide, nylon-6, and other similar polymeric binders or mixtures thereof.

Formulations of the nano-composite structures of the present invention can vary according to their intended use. In one embodiment, the structure may be formulated with less than about 40% w/w polymer binder or, more preferably, less than about 30% w/w polymer binder, or most preferably, less than about 20% w/w polymer binder.

According to one embodiment, the nano-composite structure includes about 10% w/w polymer, about 0.1-1% w/w nanostructured carbon, and about 90% w/w nanoparticles.

In a preferred embodiment, the nano-composite structures according to the present invention are freestanding. "Freestanding" structures are separable from a support structure i.e., the nano-composite structure is not dependent upon another structure for support in its use e.g., as an electrode. In an alternative embodiment, the nano-composite structures according to the present invention may be used in conjunction with structures that behave as support structures.

Alternatively, or in addition to being freestanding, the nano-composite structures are formed into a suitably dimensioned sheet. For example, the nano-composite structures may have a thickness from about 1 µm to about 500 µm or, preferably, about 1-100 µm, about 100-200 µm, about 200-300 µm, about 300-400 µm, or about 400-500 µm.

As illustrated in FIG. 1, nano-composite structures according to the present invention can be formed by at least two alternative methods. The two methods differ by the point at which nanoparticles are incorporated with the nanostructured carbon to form the nano-composite structure.

According to one method, the nano-composite structures can be prepared by providing a dispersion of nanostructured carbon in an organic solvent and incorporating nanoparticles into the dispersion. The dispersion containing the nanostructured carbon and nanoparticles is formed into a nano-composite structure.

According to an alternative method, the nano-composite structures can be prepared by providing a dispersion of nanostructured carbon in an organic solvent and forming the dispersion into a sheet. Nanoparticles are incorporated into the sheet under conditions effective to make a nano-composite structure.

Dispersions of nanostructured carbon, preferably purified nanostructured carbon, can be prepared using batch ultrasonication, mechanical stirring, horn tip ultrasonication, and other methods effective to homogeneously stabilize nanostructured carbon in solution.

In the methods of making nano-composite structures according to the present invention, dispersing nanostructured carbon in an organic solvent involves rendering the purified nanostructured carbon mobile in solution under specific conditions. Preferably, two electrodes are placed opposite each other in a container that also contains the nanostructured carbon dispersion. An electric field is then applied between the electrodes. The nanostructured carbon will migrate in the solution to one or both electrodes after sufficient time according to solvent properties (i.e., dielectric constant) and solution temperature. Methods of preparing dispersions of nanostructured carbon are described in U.S. Patent Application Publication No. 2008/0008643, which is hereby incorporated by reference in its entirety.

Suitable organic solvents for dispersing the purified nanostructured carbon include, without limitation, alkyl amide solvents, preferably N,N-dimethylacetamide, 1-2 dichlorobenzene, and 1-chloronaphthalene. Alkyl amide solvents used in dispersing nanostructured carbon are described in U.S. Patent Application Publication No. 2008/0008643, which is hereby incorporated by reference in its entirety.

As illustrated in FIG. 1, nanoparticles can be incorporated with the nanostructured carbon material at either the dispersion stage or after the nanostructured carbon has been formed into a sheet. When nanoparticles are incorporated with the nanostructured carbon at the dispersion stage, suitable methods include, without limitation, mixing, electrolytic deposition, and chemical attachment (e.g., covalent, noncovalent, and/or electrostatic). Alternatively, when nanoparticles are incorporated with the nanostructured carbon after formation of the nanostructured carbon into a sheet, suitable methods may include, without limitation, thermal deposition, sputter deposition, pulsed laser deposition, electro-deposition (electro-plating), or electroless deposition.

In carrying out the methods of the present invention, it may be desirable to incorporate a polymeric binder into the dispersed nanostructured carbon. The polymer is incorporated during the dispersion process at a concentration effective to homogenously bind the nanostructured material components together forming a contiguous film.

As illustrated in FIG. 1, formation of the dispersion containing nanostructured carbon (and, optionally, nanoparticles) into a nano-composite structure is preferably carried out by vacuum filtration, a procedure familiar to those of skill in the art. Deposition of nanoparticles onto a nanostructured carbon support can also be performed using conventional vacuum deposition methods including, but not limited to, chemical vapor deposition, physical vapor or thermal deposition, cathodic arc deposition, ion sputtering, and ion beam assisted deposition (IBAD). A method which requires less vacuum is jet vapor deposition. Because the materials are deposited in vacuum (typically less than 13.3 mPa, or $1\times10^{-4}$ torr), contamination can be minimized while maintaining good control over thickness and uniformity. The present invention makes use of these and other vacuum deposition techniques.

The formed nano-composite structure can be dried. Suitable drying methods are preferably carried out at a temperature sufficient to remove any solvent residue during processing (e.g., heated drying, vacuum drying, heated vacuum drying), but not beyond the stable melting point of the nano-composite. Preferred drying conditions include a temperature of approximately 100° C. in vacuo.

The overall dimension (i.e., size) of the nano-composite structure may vary depending on its particular use. For example, as explained in more detail below, the nano-composite structures may be used in a lithium ion battery, capacitor, supercapacitor, battery/capacitor, fuel cell, or in conjunction with a photovoltaic cell.

A further aspect of the present invention relates to a lithium ion battery containing the nano-composite structure of the present invention, where the nano-composite structure is present as at least one electrode in the lithium ion battery.

Lithium-ion batteries include a positive current collector having an active material provided thereon and a negative current collector having an active material provided thereon. Together the positive current collector and the active material provided thereon are referred to as a positive electrode, while the negative current collector and the active material provided thereon are referred to as a negative electrode.

Figure 2:
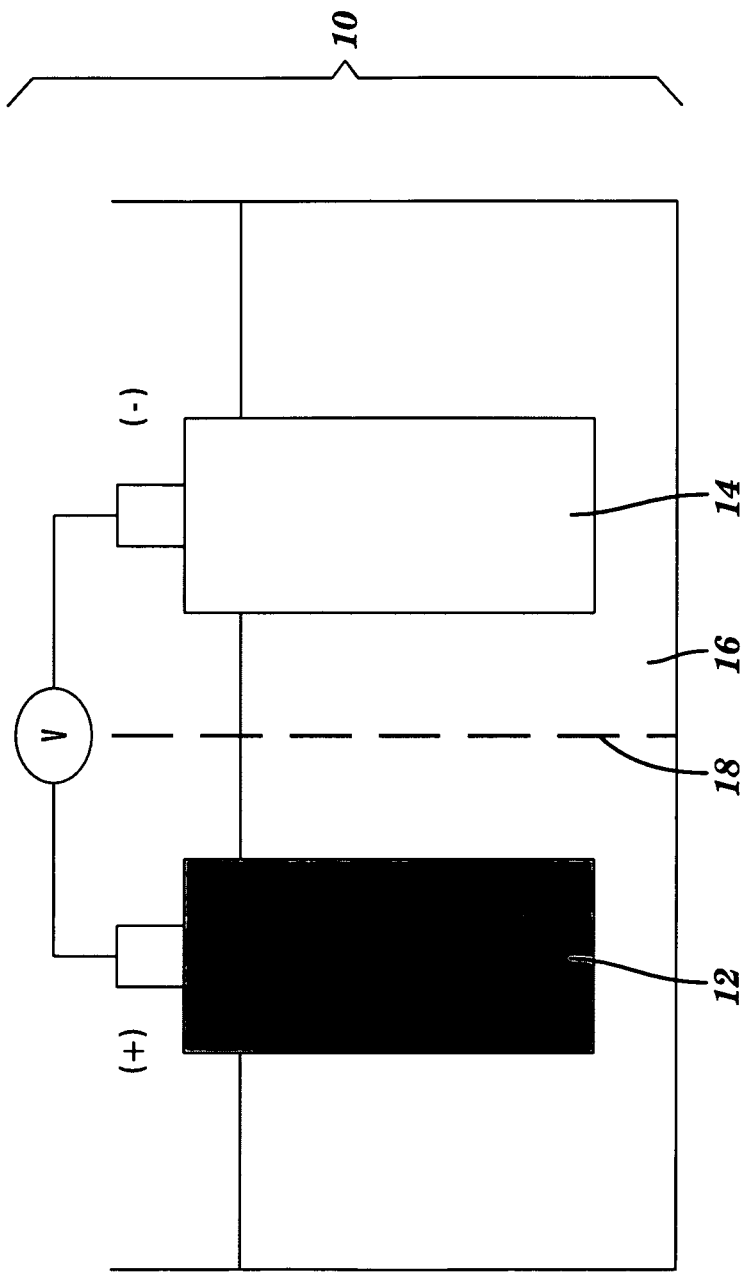
FIG. 2 illustrates one embodiment of a lithium ion battery that can incorporate a nano-composite structure of the present invention as one or both of the electrodes.

FIG. 2 illustrates one embodiment of a portion of lithium-ion battery. Battery 10 includes positive electrode 12, negative electrode 14, an electrolyte material 16, and separator 18 (e.g., a polymeric microporous separator) provided intermediate or between positive electrode 12 and negative electrode 14. Electrodes 12 and 14 may be provided as relatively flat or planar plates or may be wrapped or wound in a spiral or other configuration (e.g., an oval, prismatic, or jelly roll configuration). Electrodes 12 and 14 may also be provided in a folded configuration. In a preferred embodiment, one or both of electrodes 12 and 14 are formed from the nano-composite structures according to the present invention and are in the form of a free-standing electrode support.

Electrolyte material 16 may be liquid or solid. Suitable liquid and solid electrolytes are known in the art. For example, liquid electrolyte material includes solid lithium-salt electrolytes, such as $LiPF_6$, $LiBF_4$, or $LiClO_4$, held in an organic solvent, such as ether, ethylene carbonate, propylene carbonate, or dimethyl carbonate, diethyl carbonate, dipropyl carbonate, and ionic liquids. In contrast, for solid electrolyte material, lithium-salt electrolyte is held in a solid polymer composite such as polyethylene oxide or polyacrylonitrile.

During charging and discharging of battery 10, lithium ions move between positive electrode 12 and negative electrode 14. For example, when battery 10 is discharged, lithium ions flow from negative electrode 14 to positive electrode 12. In contrast, when battery 10 is charged, lithium ions flow from positive electrode 12 to negative electrode 14.

Yet another aspect of the present invention relates to a capacitor, supercapacitor, or battery/capacitor containing the nano-composite structure of the present invention.

When a DC voltage is applied to a pair of electrodes that are immersed in an ion-containing electrolyte, it causes migration of different species of ions in the electrostatic field near the electrode interface where a space charge layer forms. This space charge layer is termed the electric double layer. The device is called an electric double layer capacitor because it works on the principle of charge storage in this charged layer.

Figure 3:
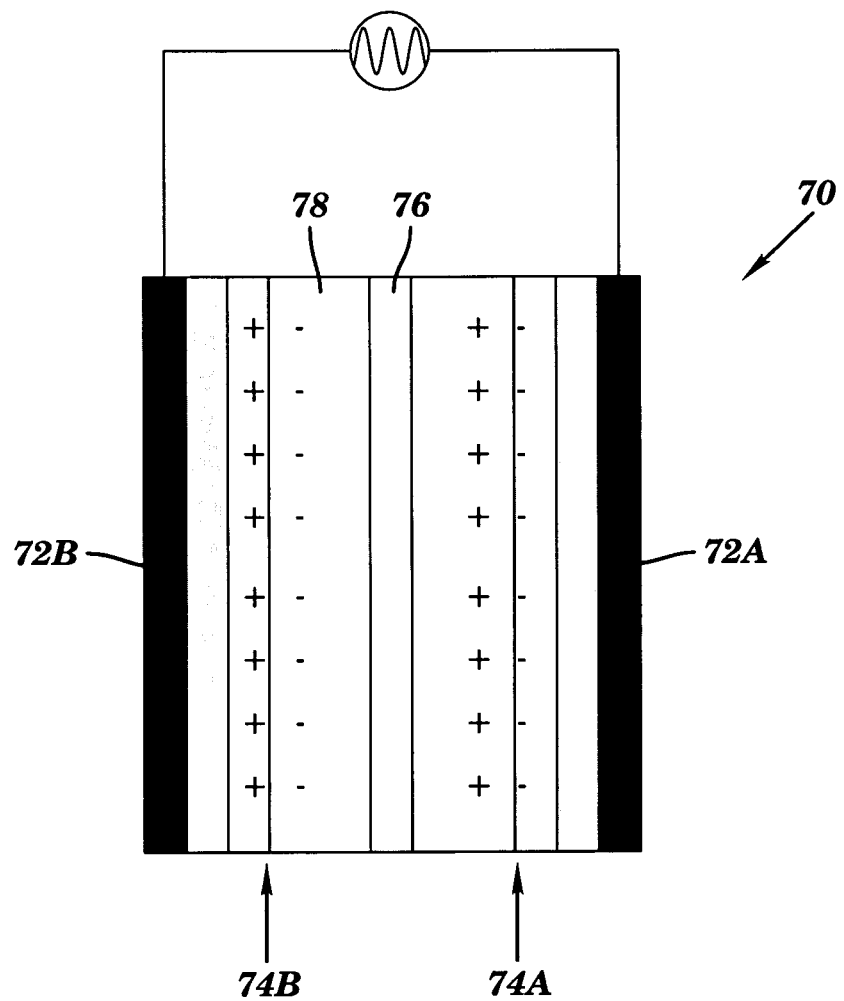
FIG. 3 illustrates one embodiment of a capacitor containing nano-composite structures according to the present invention as electrodes.

Referring to FIG. 3, capacitor 70 has electrodes 72A and 72B, electric double layers 74A and 74B, separator 76, and electrolyte solution 78. The structure of capacitor 70 is nearly identical to that of a battery differing only in terms of the materials used for negative and positive electrodes 72A and 72B, and the make up of electrolyte solution 78. According to one embodiment, both electrodes 72A and 72B are nano-composite, free-standing, SWNT electrodes according to the present invention, with separator 76 being formed from a polymer (Teflon).

Any suitable electrolyte solution can be used. Exemplary electrolytes include, without limitation, aqueous solutions of KOH, $HNO_3$, HCl, tetraethylammonium bis(oxaloato)borate (TEABOB), tetraethylammonium tetrafluoroborate (TEABf4), or triethylmethylammonium tetraflouraborate dissolved in acetonitrile (solvent).

The nano-composite structures of the present invention can be used in a double layer capacitor where a charged double layer exists at the electrode interface. Thus, referring to FIG. 3, nano-composite electrodes 72A and 72B are in contact with electrolyte solution 78 which provides the ions for formation of opposite charges across an electrode-electrolyte interface. This charge separation acts like a parallel plate capacitor.

Still another aspect of the present invention relates to a fuel cell containing the nano-composite structure of the present invention.

Figure 4:
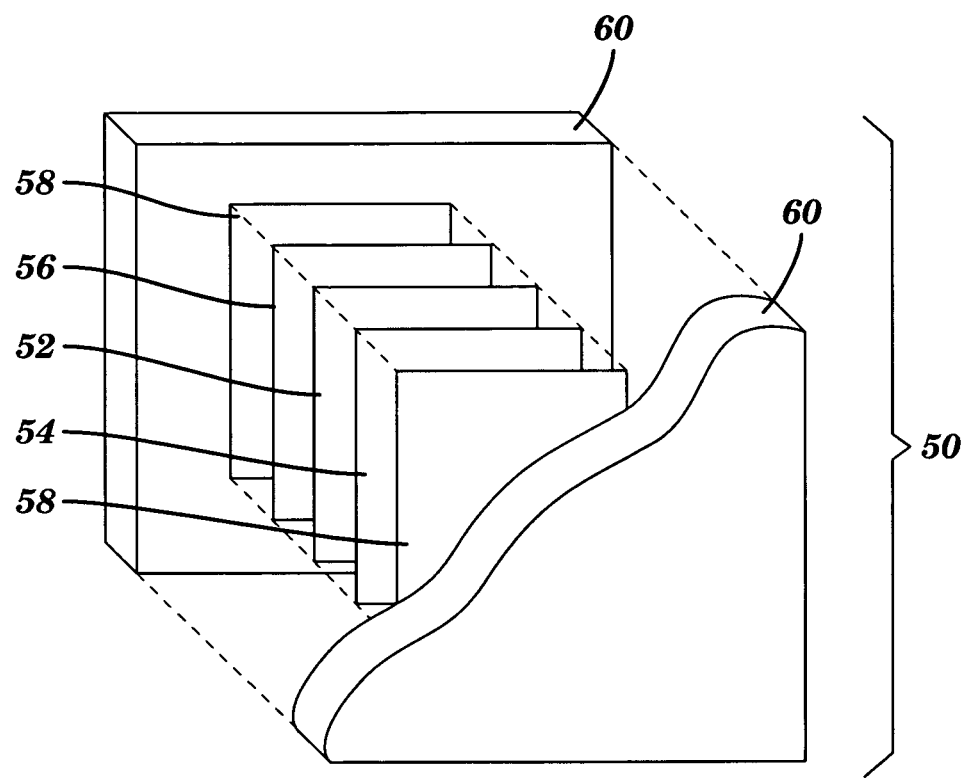
FIG. 4 illustrates one embodiment of a fuel cell containing a seven-layer membrane electrode assembly ("MEA"). The sealing gasket and gas diffusion layers are shown together to simplify the illustration. One or both of the electrodes include a nano-composite structure of the present invention as catalyst.

FIG. 4 illustrates the basic construction of a proton exchange membrane ("PEM") fuel cell that can incorporate the nano-composite structures according to the present invention. Seven layer MEA 50 includes a central proton exchange membrane 52 flanked on opposite sides by an anode catalyst layer 54 and a cathode catalyst layer 56, all of which are sandwiched between a pair of gas diffusion layers/current collectors that are sealed with a gasket, collectively denoted

58. The MEA is positioned between a pair of end plates 60, one of which directs the flow of hydrogen over the anode catalyst, and the other of which directs the flow of oxygen (air) over the cathode catalyst and concomitant removal of water therefrom. The end plates are provided with channels through which the fluids flow.

According to one embodiment, both the anode and cathode catalyst layers are formed using the nano-composite structure of the present invention.

In another embodiment, the cathode catalyst layer is formed using the nano-composite structure of the present invention and the anode catalyst layer includes any other conventional catalyst material suitable for use as the anode.

Any suitable gas diffusion layer ("GDL") can be employed in the MEA. Known GDLs include, without limitation, water-proofed carbon paper coated with a hydrophilic diffusion layer (for anode side) or hydrophobic diffusion layer (for cathode side). Conventional coating materials include PTFE and TEFLON®.

The end plates are typically formed of machined aluminum or stainless steel, although for purposes of reducing the weight of the overall fuel cell stack, polymer materials can also be used. For example, end plates formed of FORTRON® polyphenylene sulfide (PPS) or CELSTRAN® PPS-glass fiber (GF) are available from Celanese AG (Dallas, Tex.). These materials satisfy the requirements of structural rigidity even at temperatures well in excess of the operating temperatures of the fuel cell.

Although a seven-layer MEA is illustrated in FIG. 3, it should be appreciated that any MEA design can be fabricated using the electrode of the present invention.

In a preferred embodiment of the present invention, the catalyst layer, gas diffusion layer, and current collector are combined into a single layer made of the nano-composite structure of the present invention. The nano-composite structure has a proper distribution of catalyst particles deposited onto a nanostructured carbon free-standing electrode which is both porous and electrically conductive.

EXAMPLES

The Examples set forth below are for illustrative purposes only and are not intended to limit, in any way, the scope of the present invention.

Example 1

Experimental Verification

Single wall carbon nanotubes were synthesized using pulsed laser vaporization and purified using the NanoPower Research Labs' (at Rochester Institute of Technology, Rochester, N.Y.) thermal oxidation profiling procedure to achieve carbonous purities equivalent to the "100%" reference sample.

In the present case, the synthesis conditions were as follows: the Alexandrite laser pulse was rastered (corner to corner over 1 cm² with 50% overlap of 100 μs pulses at a repetition rate of 10 Hz) over the surface of a graphite (1-2 μm) target doped with 2% w/w Ni (<1 μm) and 2% w/w Co (<2 μm), at an average power density of 100 W/cm². The reaction furnace temperature was maintained at 1150° C., with a chamber pressure of 700 torr under 100 sccm flowing Ar in a 46 mm inner diameter (50 mm outer diameter) quartz tube. Purification of the raw SWNT soot was purified by conventional acid reflux. The ratio of materials for refluxing was as follows: 250 mg raw soot added to the acid solution (150 mL $H_2O$, 36 mL concentrated $HNO_3$ (69-70%), and 15 mL concentrated HCl (36.5-38.0%)). The reaction solution was brought to reflux at 120° C. for 14 hrs. The reflux solution was filtered over a 1 μm PTFE membrane filter with copious distilled $H_2O$ to form SWNT papers. The acid filtrate was discarded and subsequent washes (3×) with 50 mL acetone and 10 mL distilled $H_2O$ removed functionalized carbon impurities until the filtrate was clear. The resulting papers from acid-reflux were also thermally oxidized at 550° C.

Figure 5B:
FIGS. 5A-B are SEM images of one embodiment of a nano-composite structure (i.e., nano Si-SWNT) according to the present invention. The nano-composite structure contains nanoparticles of silicon mixed with a high purity SWNT sample.
Figure 5A:

The SWNTs were then dispersed in N,N-dimethylacetamide and nanoparticles of silicon (<50 nm) were combined. After sonication for 30 minutes, the solution was vacuum filtered over a 0.2 μm Teflon filter and the free standing paper was removed and dried for 3 hours. The product had a ratio of 1:2 by weight of nano silicon:SWNT. Representative scanning electron micrographs of this sample are shown in FIGS. 5A-B.

Example 2

Electrochemical Cycling Results

Figure 6:
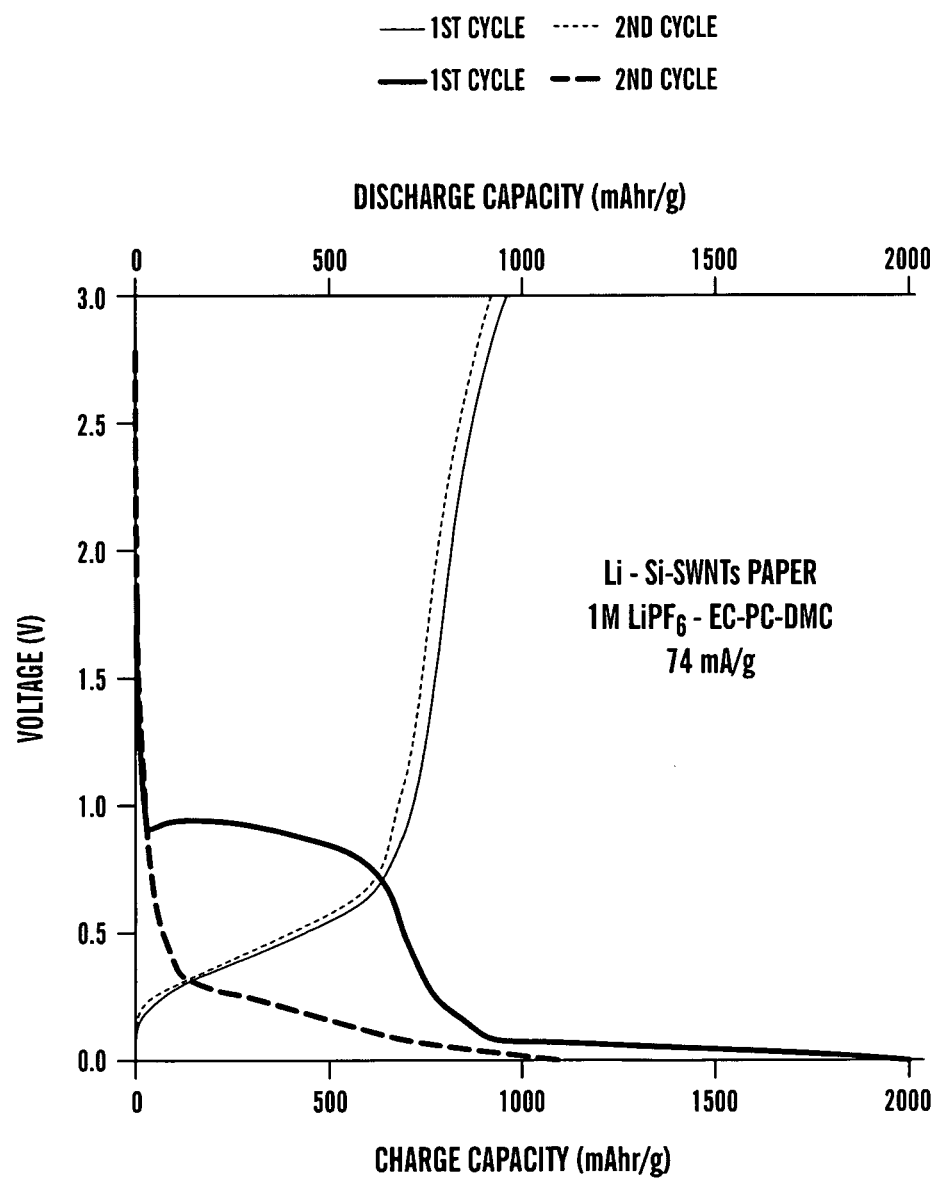
FIG. 6 is a graph showing charge/discharge data depicting the lithium ion capacity of a nano-composite structure of the present invention.

The freestanding electrode paper nano Si-SWNT was electrochemically cycled to determine the lithium ion capacity. A 6 mm disc was punched out, weighing 1.181 mg and sandwiched opposite pure lithium metal with a Celgard-2325 spacer. The electrolyte solution used was 1 M $LiPF_6$ in ethylene carbonate: propylene carbonate:dimethylcarbonate (1:1:2% vol/vol). The charge/discharge rate was at 74 mA/g and the corresponding charge/discharge data is shown in FIG. 6. The results show reversible capacities exceeding 900 mAhr/g.

Example 3

Purified SWNT Papers as a Catalyst Support by Deposition of Germanium Particles

Figure 7:
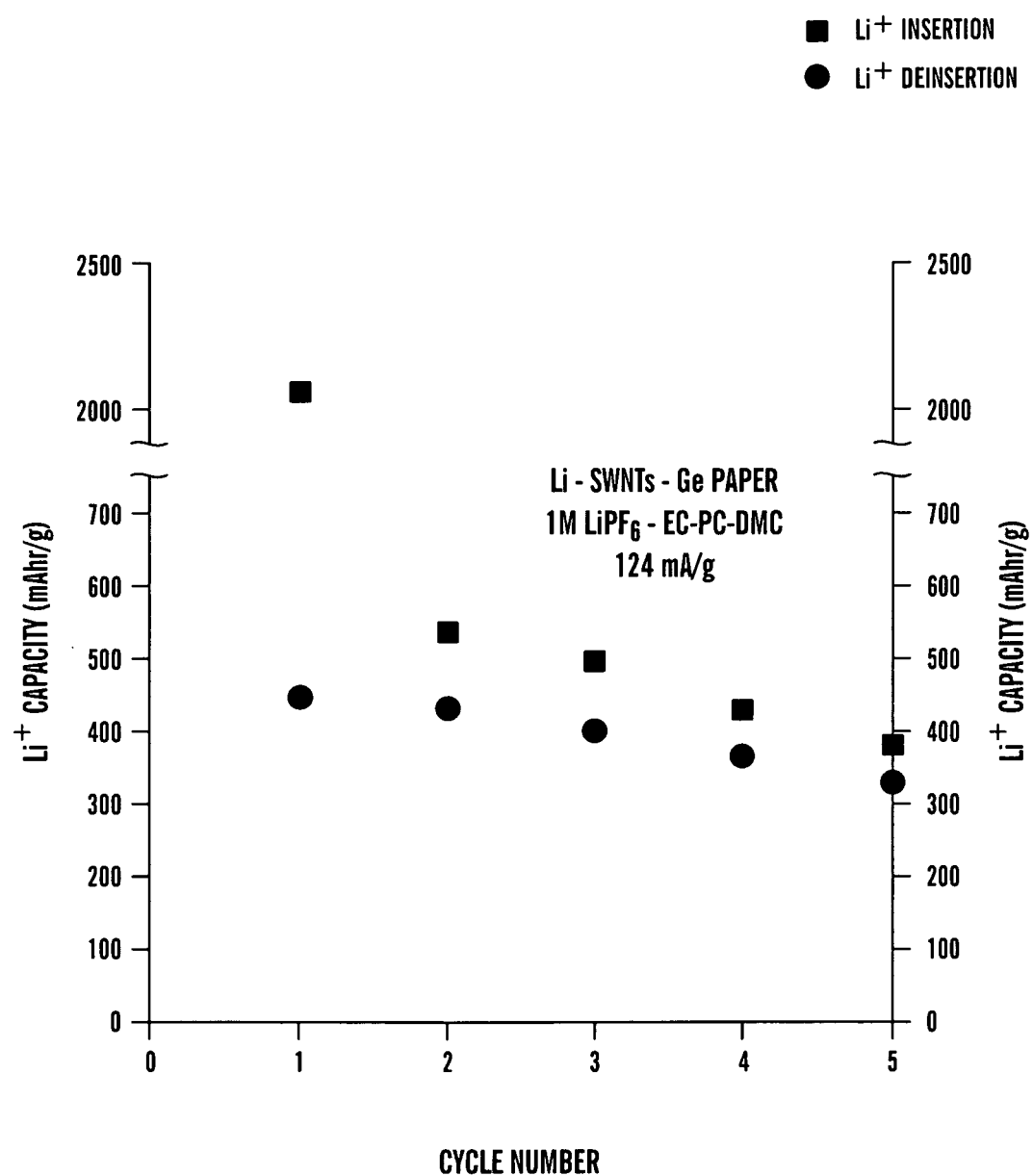
FIG. 7 is a graph showing electrochemical cycling data for a purified SWNT paper used as a catalyst support for the deposition of germanium particles using thermal evaporation.

The freestanding electrode paper using purified SWNTs was used as a catalyst support for the deposition of germanium nanostructures (10 nm) using thermal evaporation. A 6 mm disc was punched out, weighing 1 mg and sandwiched opposite pure lithium metal with a Celgard-2325 spacer. The electrolyte solution used was 1 M $LiPF_6$ in ethylene carbonate: propylene carbonate:dimethylcarbonate (1:1:2% vol/vol). The charge/discharge rate was at 124 mA/g and the corresponding charge/discharge data is shown in FIG. 7. The results show initial reversible capacities exceeding 400 mAhr/g. This is another demonstration of purified SWNT papers being used as a catalyst support by the deposition of germanium particles using thermal evaporation.

Example 4

Deposition of Noble Metal Nanostructures Using Sputtering

Figure 8B:
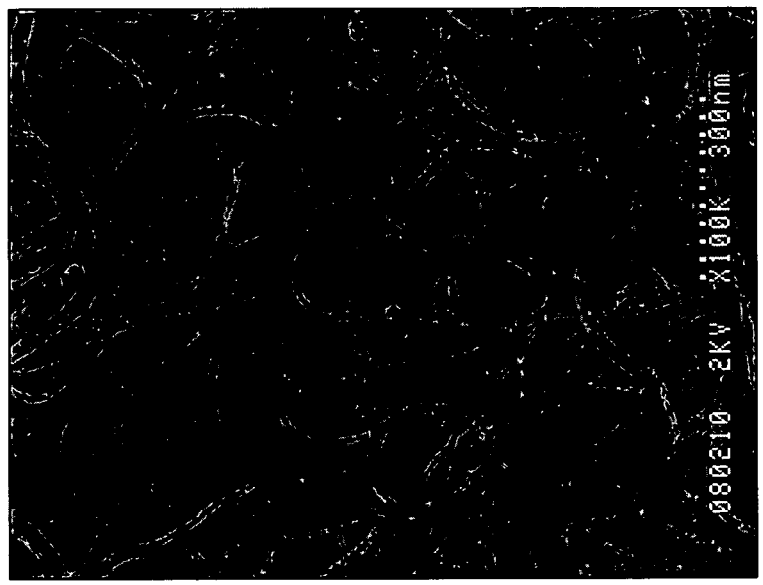
FIGS. 8A-B are SEMs of a purified SWNT paper structure (FIG. 8A) and a catalyst support for platinum nanoparticles deposited by DC sputtering (FIG. 8B).
Figure 8A:

The freestanding electrode paper using purified SWNTs can be used as a catalyst support for the deposition of noble metal nanostructures using sputtering. FIGS. 8A-B are SEMs of a purified SWNT paper structure (FIG. 8A) and a catalyst support for platinum nanoparticles (10 nm) deposited by DC sputtering (FIG. 8B). The sputtering parameters (e.g. DC bias, pressure, gas, etc.) can be tuned to systematically control the degree of deposition, including the size of the nanoparticles and the extent of uniformity.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A polymer-free nano-composite electrode comprising purified carbon nanotubes and germanium nanoparticles or purified carbon nanotubes and silicon nanoparticles, wherein the nanoparticles are non-covalently incorporated into the nano-composite electrode on exterior surfaces of the carbon nanotubes, such that the silicon nano-composite electrode comprises a reversible lithium ion charge capacity exceeding 900 milliamp-hours per gram of electrode and the germanium nano-composite electrode comprises a reversible lithium ion charge capacity exceeding 400 milliamp-hours per gram of electrode.

2. The nano-composite electrode according to claim 1, wherein the carbon nanotubes are single wall carbon nanotubes.

3. The nano-composite electrode according to claim 1, wherein the nanoparticles have a critical dimension of less than about 1 μm.

4. The nano-composite electrode according to claim 1, wherein the nanoparticles have a three-dimensional geometric shape selected from spherical, cubic, rod, oligo-pod, pyramidal, and highly branched.

5. The nano-composite electrode according to claim 1, wherein the electrode is freestanding.

6. The nano-composite electrode according to claim 1, wherein the electrode is in the form of a sheet.

7. The nano-composite electrode according to claim 1, wherein the carbon nanotubes comprise a purity of at least 75% w/w.

8. The nano-composite electrode according to claim 1, wherein the carbon nanotubes comprise a purity of at least 85% w/w.

9. The nano-composite electrode according to claim 1, wherein the carbon nanotubes comprise a purity of at least 95% w/w.

* * * * *